US005106438A

United States Patent [19]

Nopper et al.

[11] Patent Number: 5,106,438

[45] Date of Patent: Apr. 21, 1992

[54] PROCESS FOR THE PRODUCTION OF A FIBROUS MAT

[75] Inventors: Herbert Nopper, Kuppenheim; Reinhard Wirth, Gaggenau, both of Fed. Rep. of Germany

[73] Assignee: Casimir Kast Formteile GmbH. & Co., Gernsbach, Fed. Rep. of Germany

[21] Appl. No.: 516,922

[22] Filed: Apr. 30, 1990

[30] Foreign Application Priority Data

Apr. 29, 1989 [EP] European Pat. Off. .......... 89107832

[51] Int. Cl.[5] ........................ B32B 17/02; B27N 3/04

[52] U.S. Cl. .................................. 156/62.8; 156/62.2; 156/324; 264/128; 428/298

[58] Field of Search .................... 156/62.8, 62.4, 62.2, 156/324; 264/113, 128; 428/298

[56] References Cited

U.S. PATENT DOCUMENTS

| | | | |
|---|---|---|---|
| 2,371,313 | 4/1941 | Rast et al. | 156/62.8 |
| 3,865,661 | 2/1975 | Hata et al. | 156/62.2 |
| 4,132,821 | 1/1979 | Hiers et al. | 428/288 |
| 4,290,988 | 9/1981 | Nopper et al. | 264/118 |
| 4,451,310 | 5/1984 | Lairloup | 156/78 |
| 4,521,477 | 6/1985 | Kiss | 156/62.2 |
| 4,606,782 | 8/1986 | Demetriades | 156/62.8 |
| 4,690,860 | 9/1987 | Radvan et al. | 264/266 |
| 4,784,903 | 11/1988 | Kiss | 428/285 |
| 4,923,547 | 5/1990 | Yamaji et al. | 156/62.2 |
| 4,997,607 | 3/1991 | Nopper et al. | 264/118 |

*Primary Examiner*—Michael W. Ball
*Assistant Examiner*—Daniel J. Stemmer
*Attorney, Agent, or Firm*—Antonelli, Terry, Stout & Kraus

[57] ABSTRACT

A process for producing a low density fibrous mat from which a molded article may be formed by molding at elevated temperature, and which comprises a first layer of fibers, as well as thermosetting and thermoplastic binders, and at least one open covering layer of tangled fibers connected thereto is disclosed. The process including the steps of producing the first layer spreading a mixture of the fibers and the binders on to a rotating carrier web to form a continuous fleece and compressing the continuous fleece in a continuous process an elevated temperature and accompanied by the activation of part of the binders to give a transportable-resistant fibrous mat. On this fibrous mat are placed the tangled fibers forming the covering layer in the form of a continuous, open tangled fiber fleece and the latter is connected to the fibers and/or the binders of the first layer by binders having an affinity therewith. The covering layer has a higher density than the first layer.

23 Claims, No Drawings

PROCESS FOR THE PRODUCTION OF A FIBROUS MAT

The invention relates to a process for the production of a low density fibrous mat formable by molding at elevated temperature into a molded article the fibrous mat comprising a first layer of fibers, and thermosetting and thermoplastic binders, and at least one open covering layer of tangled fibers connected thereto, in which for producing the first layer a mixture of the fibers and the binders is spread out on to a moving carrier web to form an endless fleece and the latter is compressed in a continuous process at elevated temperature and accompanied by the activation of at least part of the binder to give a transportable fibrous mat.

In a known process (DE-28 45 112), the fibers together with the dry binder ground in powder form are simultaneously mixed and the mixture is then spread out to form a fleece, which is subsequently compressed to a mat at elevated temperature. The heat supplied leads to a partial activation of the binder or specific components, particularly the thermoplastic components, so that a fiber compound is obtained, which although having a low density, still has an adequate transportation and storage stability. The mat is then cut into transportable and handlable blanks. From the fibrous mat or the blanks moldings are produced by molding at a further increased temperature and which can be used for many different purposes, e.g. as parts for the internal lining or covering of motor vehicles, as furniture moldings, etc. During this forming process, in particular the thermosetting components of the binders are activated and, following the molding process, give the molding the necessary dimensional stability.

In order to obtain special physical characteristics, e.g., increased wet strength and tropical climates stability, it is frequently necessary to introduce liquid or aqueous binders into the fibrous mixture, in order to adhesively cover the individual fibers. In addition, additives are added to the mixture in order to influence the physicochemical characteristics in a specific direction. These e.g., include mold parting agents for the subsequent molding process, water repellents, elasticators, fungicides, dye pigments, etc. Fibrous mats of the aforementioned type are processed in large quantities into moldings and have proved very satisfactory in use.

However, it is a disadvantage of the known fibrous mats or the process used for the production thereof that all the components admixed with the fibers are homogeneously distributed throughout the mixture and therefore also within the fibrous mat. Thus, the quantity of binders or additives necessary for a specific physicochemical or technical behaviour of the molding must be present throughout the cross-section of the mat or molding.

It is admittedly known to apply binders to the surface of fibrous mats, particularly those made from glass fibers, which has hitherto taken place by spraying, dipping, pouring on by means of slot nozzles or by doctor blade application. However, all these methods lead to a non-uniform binder application and in particular to a non-uniform surface, which either does not permit further processing to moldings or only permits this when specific fibers are used. These methods in particular suffer from the disadvantage that not all the fibers are incorporated in to the surface, i.e., a smooth surface cannot be obtained Thus, striations or air inclusions occur on the surface. In order to obtain a completely satisfactory surface quality, it has hitherto been necessary to form the fleece from two or more successively spread on fibrous layers, each of which has the composition desired for the final molding.

Another possibility of locally influencing in a clearly defined manner the physical, technical or chemical characteristics of the fibrous mat or the molding produced therefrom consists of applying higher tensile strength covering layers to the fibrous mat. This takes place, e.g., in the aforementioned process (DE 36 29 891), in that tangled fibers are applied to one or both sides of the fibrous mat and are connected to the latter by means of thermally hardening binders with which the tangled fibers are impregnated. Thus, the actual fibrous mat forms a low density central layer, whose surface is improved by the covering layers. Preference is given in the covering layers to an open structure, so as not to produce a barrier layer effect against moisture, heat, etc. The preparation and application of the tangled fibers, is complicated and considerable expenditure is involved in placing the tangled fibers on the central layer so that the covering layers always have a constant structure and the same fiber. proportions and arrangement, which is a prerequisite for the constant quality of the moldings produced therefrom.

According to the invention the known process is simplified and a constant mat quality obtained in that the tangled fibers forming the covering layer are, brought together as a continuous, open tangled fiber, fleece with the first layer following compression and the tangled fiber fleece is joined to the fibers and/or binders of the first layer by means of binders having an affinity therewith.

Thus, in this process use is made of a prepared tangled fiber fleece of constant quality, which is only applied following the compression of the first layer and is bound directly into the latter, so that after the tangled fiber fleece has been placed on the first layer, it undergoes no or no significant structural change. From such fibrous mats, which have been finished on the surface side, it is in particular possible to produce moldings, which have a low density and also an adequate dimensional stability. This, e.g., applies for those inside lining parts on motor vehicles which are to contribute to the sound insulation, e.g., for the roof or roof canopy. Thus, by using the inventive process it is, e.g., possible to produce mats with a density of only 0.05 $g/cm^3$, which can be processed without any problem to self-supporting moldings.

The aforementioned process is preferably performed in such a way that the tangled fiber fleece is supplied to the compressed first layer directly upstream of a roller applying the binder from the liquid phase and by means of the roller is pressed onto the layer under a weak pressure and at the same, time the affine binders impregnate the tangled fiber fleece and penetrate the adjacent first layer, but without the latter being additionally compressed.

Thus, a substantially untreated tangled fiber fleece is placed on the first layer and the binder is incorporated to such an extent via the outer boundary layers of the layer union, that simultaneously with impregnation of binder into the outer boundary layer, penetration takes place of the binder into the first layer for binding the tangled fiber fleece into the first layer. In this manner, the first layer has a lower density than the outer boundary layer.

A preferred embodiment is characterized in that to the top and bottom of the compressed layer is supplied in each case a tangled fiber fleece forming a covering layer and the layer union is passed through a pair of rollers applying the liquid binder to both sides. This gives a fibrous mat, which has a precompressed central layer and a covering layer on each of its sides.

As a function of the required characteristics of the molding, the tangled fiber fleece can be formed from a material selected from the group consisting of cellulose, glass fiber, polyester fibers, and viscose fibers, as well as mixed fibers, and has a weight per unit area of 20 to 1120 and preferably 40 to 60 g/m$^2$.

In a further preferred manner the layer union is passed through the pair of rollers at a speed lower than the circumferential speed thereof.

Practical tests with the inventive process have revealed that a per se known roller application of binders from the liquid phase leads to a completely satisfactory surface quality in a fibrous mat, if use is made of polished steel rollers and the application takes place under slight pressure action and with a fibrous mat transportation speed which is lower than the circumferential speed of the rollers. Slight pressure action is, in particular, understood to mean a pressure such that it does not lead to the further compression of the central layer. Following drying, a fibrous mat with a voluminous core and a very low density, as well as more dense covering layers, is obtained. The binders are concentrated in the covering layers compared with the central layer. A low density and, at the same time, good dimensional stability is more particularly required in motor vehicle linings or coverings. For example, for door linings formed from conventional fibrous mats, a density of 1.0 to 1.1 g/cm$^3$ is obtained, whereas in the case of the inventive process the density can be reduced to 0.7 to 0.8 g/cm$^3$, so that a light, but still stiff lining or covering is obtained. In the case of a roof canopy which is to have highly insulating characteristics, it is possible to obtain densities between 0.05 (partial) and 0.1 g/cm$^3$ in the case of a wall thickness of up to 20 mm and to also high dimensional stability.

It is also possible to incorporate specific additives only in to the covering layers, in order to achieve specific surface qualities. The binders applied by means of the rollers can also be selected in such a way that the fibrous mat or the molding produced therefrom fulfills certain surface requirements. Fibrous mats having this structure can in particular be processed to moldings with a completely satisfactory smooth surface. It is also possible to obtain surfaces with a moisture barrier in the case of varying climatic conditions, so that the PE sheet hitherto necessary for this purpose can be omitted, although warping as a result of varying moisture contents is excluded. With direct painting or coloring of the molding, the attainable smooth surface leads to a reduction of the amount of paint or color required. If, instead of this, the molding, is back coated, then the necessary adhesive can be more sparingly used.

In a further development of the inventive process binders are applied in liquid phase with mainly thermosetting binder fractions. Harder and more rigid molding can be produced from such a fibrous mat. Instead of this it is possible to apply binders in the liquid phase with mainly thermoplastic binder fractions and more elastic molding can be produced therefrom.

The binder can be applied from a solution, emulsion or dispersion, preference being given to aqueous emulsions or dispersions. The thermosetting fractions can in particular be phenol, resol, melamine or urea resins, whereas the thermoplastic fractions can be homopolymers or copolymers such as acrylic resins, butadiene-styrene, butadieneacrylonitrile, polyurethanes, polyesters and vinyl ester resins. It is naturally possible to use any random combination for such a binder system.

As has already been indicated, to the liquid phase of the binder it is possible to add additives, which influence the physical, technical or chemical behavior of the fibrous mat and/or the molding molded therefrom and can be applied with the binder to said fibrous mat. These additives can in particular be water repellents, e.g. paraffin emulsions, mold parting agents, e.g. sulphonated fatty acids, elasticators, e.g. polyethylene glycol, which can react with certain binders, namely condensation resins, as well as fungicides, dye pigments, flame retardants, antioxidants, wetting agents, etc. In the same manner as the binder application from the liquid phase, the physical and technical behaviour of the molding is influenced in the layers only where it is necessary, e.g., by the addition of additives to the covering layers of the fibrous mat only. Thus, the characteristics sought by the additives are only produced in a planned manner where they are required. Thus, the binders or additives are not only locally concentrated in planned manner, but the quantity necessary for obtaining a specific property can be reduced to the amount necessary, because the binders or additives are no longer homogeneously distributed over the entire mat or molding cross-section.

It is also possible to proportionately add foamable resins or blowing agents which become active at elevated temperature to the liquid phase of the binder. These foamable resins are e.g., only activated in connection with forming to of the molding, which takes place at elevated temperature. Thus, a low density can also be obtained in the covering layers, accompanied by adequate hardness and surface quality.

The inventive process also offers the possibility of exclusively adding binders in powder form to the fibrous mixture for producing the first layer, which makes it possible to dry process the fibrous mixture to a fleece, whereas those binders which should lead to fiber impregnation are applied by means of the rollers. It has proved advantageous if the binders from the liquid phase are applied in a quantity between 10 and 150 g/m$^2$, preferably between 60 and 80 g/ m$^2$.

It has also been found to be advantageous if a solution, dispersion or emulsion with a binder-solid content of 10 to 60% by weight, and preferably 30 to 40% by weight is used, which leads to a completely satisfactory surface in the case of roller application.

Although it is possible to apply the binder in a spatially and time separated manner from the production of the transportable-resistant fibrous mat forming the first layer and, e.g., in a processing mechanism where the moldings are produced, preferably the first layer in connection with its production is brought together with the tangled fiber fleeces forming the covering layers immediately following compression to provide the necessary transportation strength and pass through the binder-applying roller pair. This gives a continuous process from the spreading out of the mixture to form a fleece until the fibrous mat has been produced with the desired characteristics in the covering layers.

Preferably, at the elevated temperature necessary for compressing the central layer to make it transportable-proof, the layer union is supplied to the roller pair for applying the binder from the aqueous phase, so that the still present enthalpy of the central layer is utilized and the drying of the fibrous mat accelerated.

It is also advantageous in this embodiment of the process if the waste air produced during the heating in connection with the compression of the first layer is used for drying the complete fibrous mat following the application of the binder from the liquid phase, which leads to a favorable energy balance. This in particular leads to the advantage that there is no increase in the costs of producing the fibrous mat compared with the conventional system. The moisture content is reduced from the initial 20% to 5 to 10%.

Finally, the layer union is cooled after drying, e.g., at ≦40° C., so as to permit a stacking of the mat blanks produced therefrom without them sticking together.

We claim:

1. A process for producing a low density fibrous mat from which a molded article can be formed by molding at an elevated temperature, comprising:

a) spreading a mixture of fibers and thermosetting and thermoplastic binders on a moving carrier web to form a continuous first fleece;

b) compressing said first fleece in a continuous process at an elevated temperature, thereby activating at least a part of said thermosetting and thermoplastic binders to form a compressed first layer;

c) supplying a continuous open tangled fiber fleece to at least one major surface of said compressed first layer directly upstream of a pair of rollers;

d) passing said continuous open tangled fiber fleece and said compressed first layer between said pair of rollers and applying binders in a liquid phase from said pair of rollers to said continuous open tangled fiber fleece and connecting said continuous open tangled fiber fleece to said compressed first layer by weak pressure of said pair of rollers, wherein said binders in the liquid phase impregnate said continuous open tangled fiber fleece and penetrate said compressed first layer; and e) passing the connected continuous open tangled fiber fleece and compressed first layer through a drying means, wherein said compressed first layer has a density lower than that of said connected continuous open tangled fiber fleece.

2. Process according to claim 1, wherein the continuous open tangled fiber fleece comprises at least one type of fiber selected from the group consisting of cellulose, glass fibers, viscose fibers and polyester fibers.

3. Process according to claim 1, wherein the continuous open tangled fiber fleece has a weight per unit area of 20 to 120 g/m$^2$.

4. Process according to claim 1, wherein the continuous open tangled fiber fleece and the compressed first layer are passed through the pair of rollers at a speed lower than a circumferential speed of said pair of rollers.

5. Process according to claim 1, wherein said binders in the liquid phase comprise thermosetting binder components.

6. Process according to claim 1, wherein said affine binders comprise thermoplastic binder components.

7. Process according to claim 1, wherein said binder in the liquid phase is applied from a solution, emulsion or dispersion.

8. Process according to claim 1, wherein said liquid phase of binders includes additives selected from the group consisting of water repellents, mold parting agent, elasticators, fungicides and dye pigments.

9. Process according to claim 1, wherein said liquid phase of said binders in the liquid phase includes foamable resins or blowing agents which become active at elevated temperatures.

10. Process according to claim 1, wherein a thermosetting and thermoplastic binder quantity necessary for the molded article is partly added to the mixture of fibers and thermosetting and thermoplastic binders prior to the production of the compressed first layer and partly via the application from the liquid phase of said binders in the liquid phase.

11. Process according to claim 1 wherein said mixture of fibers and thermosetting and thermoplastic binders consists of said fibers and binders exclusively in powder form.

12. Process according to claim 1, wherein the binders in the liquid phase are applied from the liquid phase in a quantity between 10 and 150 g/m$^2$.

13. Process according to claim 7, characterized in that a solution, dispersion or emulsion with a binder-solid content of 10 to 60 % by weight is used.

14. Process according to claim 1, wherein waste heat produced during heating in connection with the compression of the first fleece is used for drying the connected continuous open tangled fiber fleece and compressed first layer.

15. Process according to claim 1, wherein the connected continuous open tangled fiber fleece and compressed first layer is dried to a residual moisture content of 5 to 10%.

16. Process according to claim 1, wherein the connected continuous open tangled fiber fleece and compressed first layer is cooled after drying.

17. Process according to claim 16, wherein the connected continuous open tangled fiber fleece and compressed first layer is cooled to a temperature of 23 40° C.

18. Process according to claim 16, wherein, following cooling, the connected continuous open tangled fiber fleece and compressed first layer is cut to size to form blanks and the blanks are stacked.

19. Process according to claim 1, wherein a continuous open tangled fiber fleece is supplied to each major surface of said compressed first layer directly upstream of said pair of rollers.

20. Process according to claim 1, wherein the continuous open tangled fiber fleece has a weight per unit area of 40 to 60 g/m$^2$.

21. Process according to claim 1, wherein said binders in the liquid phase are applied from the liquid phase in a quantity between 60 to 80 g/m$^2$.

22. Process according to claim 7, characterized in that a solution, dispersion or emulsion with a binder-solid content of 30 to 50% by weight is used.

23. Process according to claim 1, wherein said continuous open tangled fiber fleece and said compressed first layer are passed through said pair of rollers under the condition that said compressed first layer is at approximately the elevated temperature at which it is compressed.

* * * * *